United States Patent [19]

Lach

[11] Patent Number: 4,634,170

[45] Date of Patent: Jan. 6, 1987

[54] DEVICE FOR HOLDING HINGED STRUCTURE IN OPEN POSITION

[76] Inventor: John S. Lach, 24 Talbot St., Torrington, Conn. 06790

[21] Appl. No.: 822,879

[22] Filed: Jan. 27, 1986

[51] Int. Cl.⁴ .............................................. B60R 27/00

[52] U.S. Cl. .................................... 296/76; 267/64.12; 292/258; 292/338

[58] Field of Search ................. 296/76, 56; 267/64.12; 292/258, 338, 339; 248/351

[56] References Cited

U.S. PATENT DOCUMENTS

| | | | |
|---|---|---|---|
| 3,306,656 | 2/1967 | Hughes | 296/76 |
| 3,883,126 | 5/1975 | Nicholls | 267/64.12 |
| 4,415,194 | 11/1983 | Bauer | 296/76 |
| 4,449,702 | 5/1984 | Hasegawa | 267/64.12 |

*Primary Examiner*—Robert R. Song
*Attorney, Agent, or Firm*—Richard A. Craig

[57] ABSTRACT

A hold-up device for holding a hinged structure, particularly the rear door of a hatchback automobile, in an open position relative to a frame, such as the frame of the door, against the force of gravity, wherein a hydraulic cylinder is pivotally connected to either the structure or the frame and a cylinder rod is pivotally connected to the other of the structure and the frame. The hold-up device is for use when the cylinder fails to function properly and comprises a body having first and second opposite ends and a straight elongate contoured alcove extending between the first and second ends for removably receiving the rod therein when the structure is in its open position.

10 Claims, 6 Drawing Figures

DEVICE FOR HOLDING HINGED STRUCTURE IN OPEN POSITION

The present invention relates to a device (hereinafter sometimes called "a hold-up device") for holding a hinged structure in an open position, against the force of gravity.

A widely used example of such hinged structure is found in the rear doors of so-called hatchback automobiles, each such rear door being hinged at the top and provided with a hydraulic cylinder pivotally secured to the automobile frame on one side of the door opening. The hydraulic cylinder has a cylinder rod which is pivotally secured to the door. As manufactured, when the door catch is released, the action of the hydraulic cylinder completes the opening of the door and holds the door in its open position.

Failure of such hydraulic cylinders is common, in which case the doors will not lift automatically, and, more importantly, will not stay in the open position. Failed hydraulic cylinders are expensive to replace. Heretofore, there has been no convenient way to avoid such expense.

Thus, there exists a need for a simple, inexpensive device for holding the rear door of a hatchback automobile in the open position when the hydraulic cylinder fails.

Accordingly, an important object of the invention is to provide a simple inexpensive hold-up device which fills this need. A novelty search revealed the following U.S. Patents, none of which is pertinent to the invention disclosed and claimed herein:

| U.S. Pat. No. | ISSUED | INVENTOR(s) |
|---|---|---|
| 2,973,217 | February 28, 1961 | Gregoire |
| 2,974,989 | March 14, 1961 | Hilbers |
| 3,135,555 | June 2, 1964 | McCaskey |
| 4,122,758 | October 31, 1978 | Bieringer et. al. |
| 4,124,240 | November 7, 1978 | Adelberg |
| 4,501,561 | February 26, 1985 | Speelman |

The foregoing and other objects and advantages will become apparent hereinafter.

SUMMARY OF THE INVENTION

The invention presents a hold-up device for holding a hinged structure, particularly the rear door of a hatchback automobile, in an open position relative to a frame, such as the frame of the door, against the force of gravity, wherein a hydraulic cylinder is pivotally connected to either the structure or the frame and a cylinder rod is pivotally connected to the other of the structure and the frame.

The hold-up device is for use when the cylinder fails to function properly and comprises a body member having first and second opposite ends and a straight elongate contoured alcove extending between the first and second ends for removably receiving the rod therein when the structure is in its open position.

DESCRIPTION OF THE INVENTION

Figure 6:
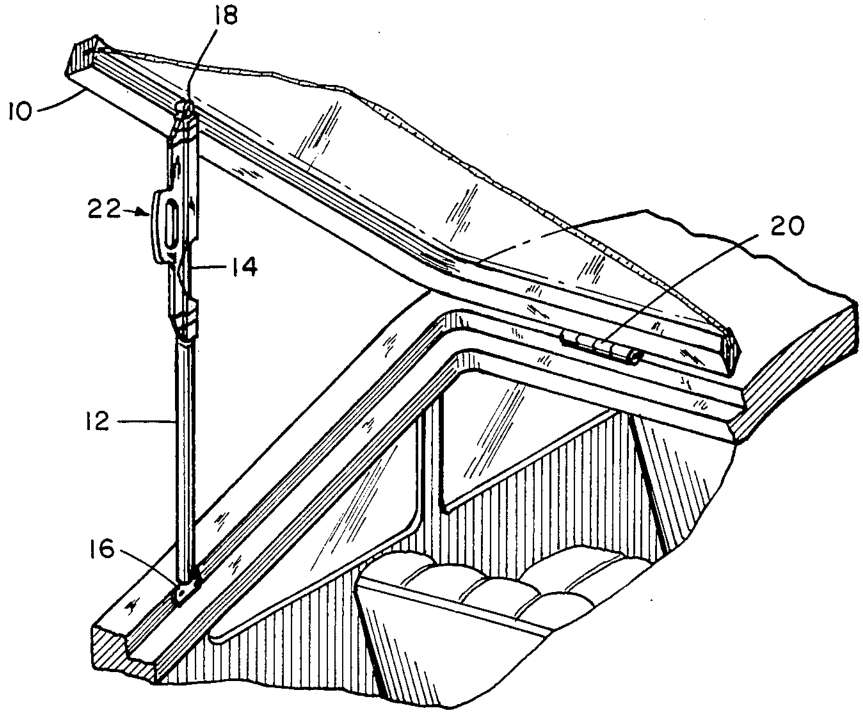
FIG. 6 is a fragmentary perspective view showing a rear door of a hatchback automobile held in open position by a hold-up device of the present invention.

The setting for this invention will first be described with reference to FIG. 6 which shows a rear door 10 of a hatchback automobile normally held in open position by a hydraulic cylinder 12 having a cylinder rod 14. Cylinder 12 is pivotally secured to the automobile frame as indicated at 16 on one side of the door opening and rod 14 is pivotally secured to door 10 a indicated at 18. As shown, rod 14 is in its extended position. Door 10 is secured at the top to the automobile frame by hinges, one of which is shown at 20. FIG. 6 also shows an inventive holdup device 22, as described below.

Typically, cylinder 12 may be about 10 inches (25.4 cm) long and rod 14 may extend about 9.5 inches (24.1 cm) therefrom when in the illustrated position.

Figure 1:
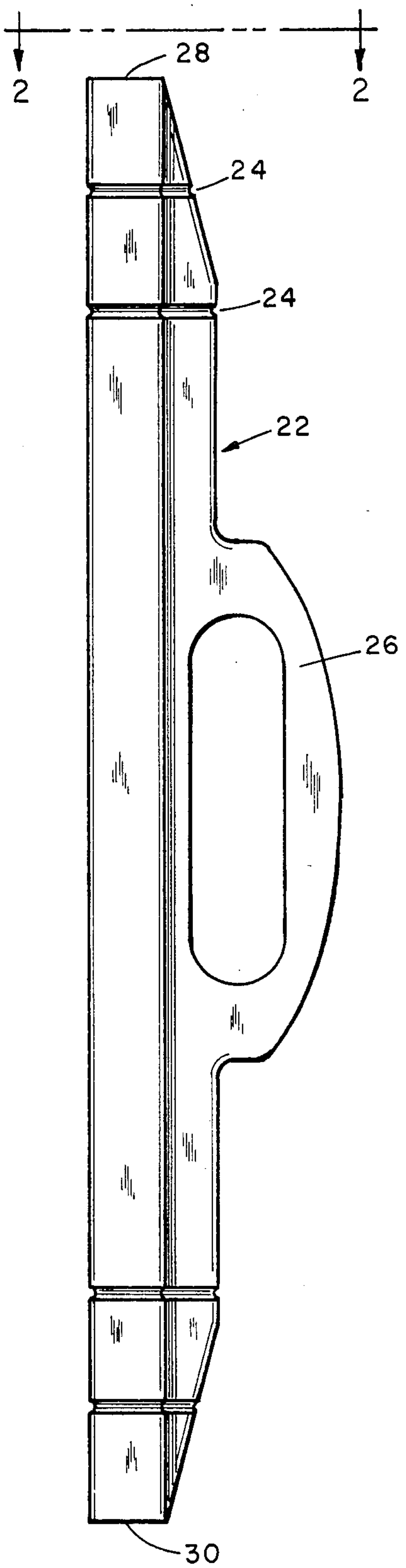
FIG. 1 is a plan view of a preferred hold-up device embodying the invention.
Figure 2:
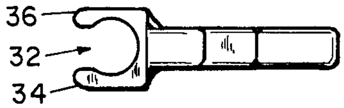
FIG. 2 is a view on line 2—2 of FIG. 1.
Figure 5:
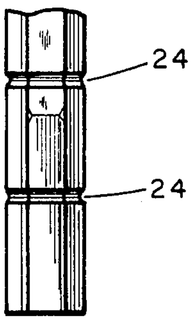
FIG. 5 is a fragmentary view on line 5—5 of FIG. 1.

A preferred embodiment of the present invention which solves the problem in a simple manner, without necessitating expensive replacement of cylinder 12 when it fails, is disclosed with particular reference to FIGS. 1, 2 and 5, in the form of a hold-up device 22 which can readily be snapped onto cylinder rod 14 with one hand when door 10 is held in the open position with the other hand.

Hold-up device 22 comprises a body 23, which is peferably of one-piece construction, having a handle 26 and opposite ends 28 and 30. A straight elongate contoured alcove 32 extends from end 28 to end 30.

As shown in FIG. 2, alcove 32 is shaped to receive rod 14 with a snap fit on both sides, by virtue of its having a pair of resiliently flexible tines 34, 36 which are mirror images of each other. When rod 14 is in alcove 32, both tines 34 and 36 overlie rod 14.

Figure 3:
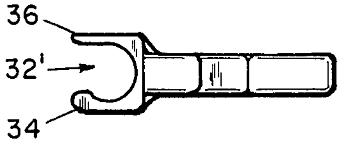
FIG. 3 is a view similar to FIG. 2 but showing a first modification of the device.

FIG. 3 shows a modified alcove 32' which has only one tine 34 which overlies rod 14. A second tine 36 is straight-sided. Thus, this modification provides snap fit reception of rod 14 on one side only.

Figure 4:
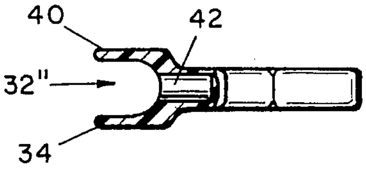
FIG. 4 is a view similar to FIG. 2 but showing a second modification of the device.

FIG. 4 shows another modified alcove 32" with two straight-sided tines 38 and does not involve snap fit reception of rod 14. Instead, this modification relies on magnet buttons in alcove 32". One such magnet button 42 is shown embedded in the bottom of alcove 32".

Alcove 32, 32' or 32" need not extend uninterruptedly from end 28 to end 30, the only requirement being that a portion of the alcove be present at each of ends 28 and 30.

The length of the hold-up device 22 from end 28 to end 30, should approximate the extended length of rod 14, so that device 22 can be placed with its alcove embracing rod 14 with door 10 in its open position, with one of ends 28 and 30 engaging the end of cylinder 12 and the other of ends 28 and 30 engaging door 10 at the end of rod 14 remote from cylinder 12, as shown in FIG. 6.

Hold-up device 22 is perferably provided with transverse grooves 24, whereby sections of device 22 can be snapped or hacked off to shorten the length of device 22 between ends 28 and 30, whereby device 22 is usable with most, if not all, extensions of cylinder rod 14.

It will be appreciated that the invention is well adapted to the attainment of the stated objects and advantages and others.

The disclosed details are exemplary only and are not to be aken as limitations on the invention except as those details may be included in the appended claims.

What is claimed is:

1. A hold-up device for holding a hinged structure in an open position relative to a frame against the force of gravity, wherein a hydraulic cylinder is pivotally connected to one of said structure and said frame and a cylinder rod is pivotally connected to the other of said structure and said frame, said hold-up device for use when said cylinder fails and comprising a body having first and second opposite ends and a straight elongate contoured alcove extending between said ends for removable reception therein of said rod with said structure in its open position.

2. A hold-up device according to claim 1 wherein the distance between said first and second ends is approximately equal to the extended length of said rod, so that when installed on said rod, said first end will engage said cylinder and said second end will engage said structure.

3. A hold-up device according to claim 2 wherein said alcove is defined by a pair of tines which are mirror images of each other so that said alcove receives said rod with a snap fit on both sides.

4. A hold-up device according to claim 2 wherein said alcove is defined by a pair of tines, only one of which provides snap fit reception of said rod, and the other of which is straight sided.

5. A hold-up device according to claim 2 wherein said alcove is defined by two straight-sided tines and said device further comprises magnetic holding means spaced along said alcove.

6. A hold-up device according to claim 1 wherein said structure is the rear door of a hatchback automobile and said frame is the frame of said door.

7. A hold-up device according to claim 1 wherein said alcove extends uninterruptedly from said first end to said second end.

8. A hold-up device according to claim 1 wherein said alcove has a first portion at said first end and a second portion at said second end.

9. A hold-up device according to claim 1 wherein said body is provided with transverse grooves whereby sections of said body may be removed to shorten the distance between said first and second ends.

10. A hold-up device according to claim 1 wherein said body is of one-piece construction.

* * * * *